United States Patent [19]

Iwasaki et al.

[11] Patent Number: 5,532,567
[45] Date of Patent: Jul. 2, 1996

[54] CONTROLLER FOR SWITCHED RELUCTANCE MOTOR

[75] Inventors: Shinichiro Iwasaki, Anjou; Masanori Sugiyama, Nishio; Chiaki Umemura, Toyohashi; Akemi Ookawa, Chita gun; Hisayoshi Takahashi, Kariya, all of Japan

[73] Assignee: Aisin Seiki Kabushiki Kaisha, Kariya, Japan

[21] Appl. No.: 411,974

[22] Filed: Mar. 28, 1995

[30] Foreign Application Priority Data

Mar. 31, 1994 [JP] Japan ................................. 6-062280

[51] Int. Cl.⁶ ........................................... H02P 7/05
[52] U.S. Cl. ......................... 318/701.000; 318/254.000; 318/611.000; 318/696.000
[58] Field of Search .................................. 318/138, 254, 318/439, 460, 611, 685, 696, 701, 702

[56] References Cited

U.S. PATENT DOCUMENTS 4,525,657  6/1985  Nakase et al. .
4,868,477  9/1989  Anderson et al. .
5,223,775  6/1993  Mongeau .
5,457,375  10/1995  Marcinkiewicz et al. .

FOREIGN PATENT DOCUMENTS

1-298940  12/1989  Japan .

*Primary Examiner*—Bentsu Ro
*Attorney, Agent, or Firm*—Sughrue, Mion, Zinn, Macpeak & Seas

[57] ABSTRACT

Suppression of a peak noise level as may be caused by a resonance when an SR motor is driven is intended. An offset is intentionally provided between a position for a maximum drive efficiency where the energization is to be switched and a position where the energization is actually switched. Such offsets $s1, s2, s3, \ldots$ are generated in terms of random numbers, producing a fluctuation in the frequency of the oscillations which result. The fluctuation in the frequency is effective to prevent the occurrence of a resonance. In order to avoid a resulting reduction in the drive efficiency, the magnitude of such offsets are limited to lie within a permissible shift angle, which is in turn determined in terms of the prevailing torque and number of revolutions, by reference to a map.

7 Claims, 11 Drawing Sheets

Fig. 7 current map

| | | torque [N·m] | | | | | | |
|---|---|---|---|---|---|---|---|---|
| | | ...10 | 15 | 20 | 25 | 30 | 35 | ... |
| number of revolutions [rpm] | 200 | C11 | C21 | C31 | C41 | C51 | C61 | |
| | 300 | C12 | C22 | C32 | C42 | C52 | C62 | |
| | 400 | C13 | C23 | C33 | C43 | C53 | C63 | |
| | 500 | C14 | C24 | C34 | C44 | C54 | C64 | |
| | 600 | C15 | C25 | C35 | C45 | C55 | C65 | |
| | 700 | C16 | C26 | C36 | C46 | C56 | C66 | |

Example (content of C34): 52.5° angle for turn-on / 82.5° angle for turn-off / 200 [A] target current value shift map

| | | torque [N·m] | | | | | | |
|---|---|---|---|---|---|---|---|---|
| | | ...10 | 15 | 20 | 25 | 30 | 35 | ... |
| number of revolutions [rpm] | 200 | D11 | D21 | D31 | D41 | D51 | D61 | |
| | 300 | D12 | D22 | D32 | D42 | D52 | D62 | |
| | 400 | D13 | D23 | D33 | D43 | D53 | D63 | |
| | 500 | D14 | D24 | D34 | D44 | D54 | D64 | |
| | 600 | D15 | D25 | D35 | D45 | D55 | D65 | |
| | 700 | D16 | D26 | D36 | D46 | D56 | D66 | |

Example (content of D34): 5° (permissible shift angle)

Fig. 8 energization map

| rotor angle | current value [A] | | |
|---|---|---|---|
| | phase 1 | phase 2 | phase 3 |
| 0.0 | 0 | 0 | 200 |
| 0.5 | 0 | 0 | 200 |
| 1.0 | 0 | 0 | 200 |
| 1.5 | 0 | 0 | 200 |
| 2.0 | 0 | 0 | 200 |
| 2.5 | 0 | 0 | 200 |
| ⋮ | ⋮ | ⋮ | ⋮ |

Fig. 10

Fig. 11 actual noise level data of vihicle 5,532,567

CONTROLLER FOR SWITCHED RELUCTANCE MOTOR

FIELD OF THE INVENTION

The invention relates to a controller for a switched reluctance motor.

BACKGROUND OF THE INVENTION

A switched reluctance motor (hereafter abbreviated as SR motor) generally comprises a rotor having outwardly salient poles and a stator having poles which project inwardly. The rotor comprises an iron core formed by a lamination of iron laminae while the stator includes a coil, which is a concentrated winding, for each pole. The operation of the SR motor is such that each pole of the stator acts as an electromagnet exerting a magnetic force, which attracts the poles of the rotor, thus rotating the rotor. Accordingly, the rotor may be rotated in a desired direction by sequentially switching the energization of the coil disposed around each pole of the rotor depending on the rotational position of the respective poles of the rotor.

A prior art for such SR motor is disclosed, for example, in Japanese Laid-Open Patent Application No. 298,940/1989.

An SR motor includes a number of advantages in that the construction is simple and mechanically robust and that an operation under elevated temperatures is possible. However, as a matter of practice, it is only rarely used. One of the reasons relates to the generation of noises during its rotation. In the SR motor, the energization of the individual poles of the stator is turned on and off when each pole of the rotor assumes a particular rotational position. Accordingly, the force of magnetic attraction which is applied to the rotor rapidly changes in magnitude upon such switching. This causes a mechanical oscillation of a relatively large magnitude to both the rotor and the stator, resulting in the noises generated.

To reduce such noises to a practical level, the rigidity of the stator, the rotor and bearings which form together the SR motor must be substantially increased as compared with a conventional motor, making it unavoidable that the cost of the SR motor itself becomes increased.

SUMMARY OF THE INVENTION

Accordingly, it is a task of the invention to suppress the generation of noises during the rotation of the SR motor without accompanying a substantial increase in the cost.

The above task is solved in a controller for a switched reluctance motor including means (1d) for detecting a rotational position of a rotor (R) and in which an electrical coil (1a, 1b, 1c), which is used to drive the rotor, is turned on and off when each pole of the rotor assumes a particular rotational position. In accordance with the invention, there is provided position modifying means (11, 6B) for providing an offset between the particular rotational position and a position where the coil is turned on or off and for periodically modifying the magnitude of the offset.

In a preferred embodiment, the position modifying means includes random number generating means (69, 6A) or determining the offset mentioned above in a range defined by predetermined limit values.

In another preferred embodiment of the invention, there is also provided speed detecting means (1e) which detects the rotational speed of the rotor, and the position modifying means includes means (13b, 69) for determining the limit values for the offset on the basis of the rotational speed of the rotor which is detected by the speed detecting means.

It is to be understood that numerals and characters appearing in parentheses refer to the reference characters used to designate corresponding elements appearing in an embodiment to be described later, but it should be understood that the components or elements which are used to construct the invention are not limited to specific elements shown in the embodiment.

Figure 3:
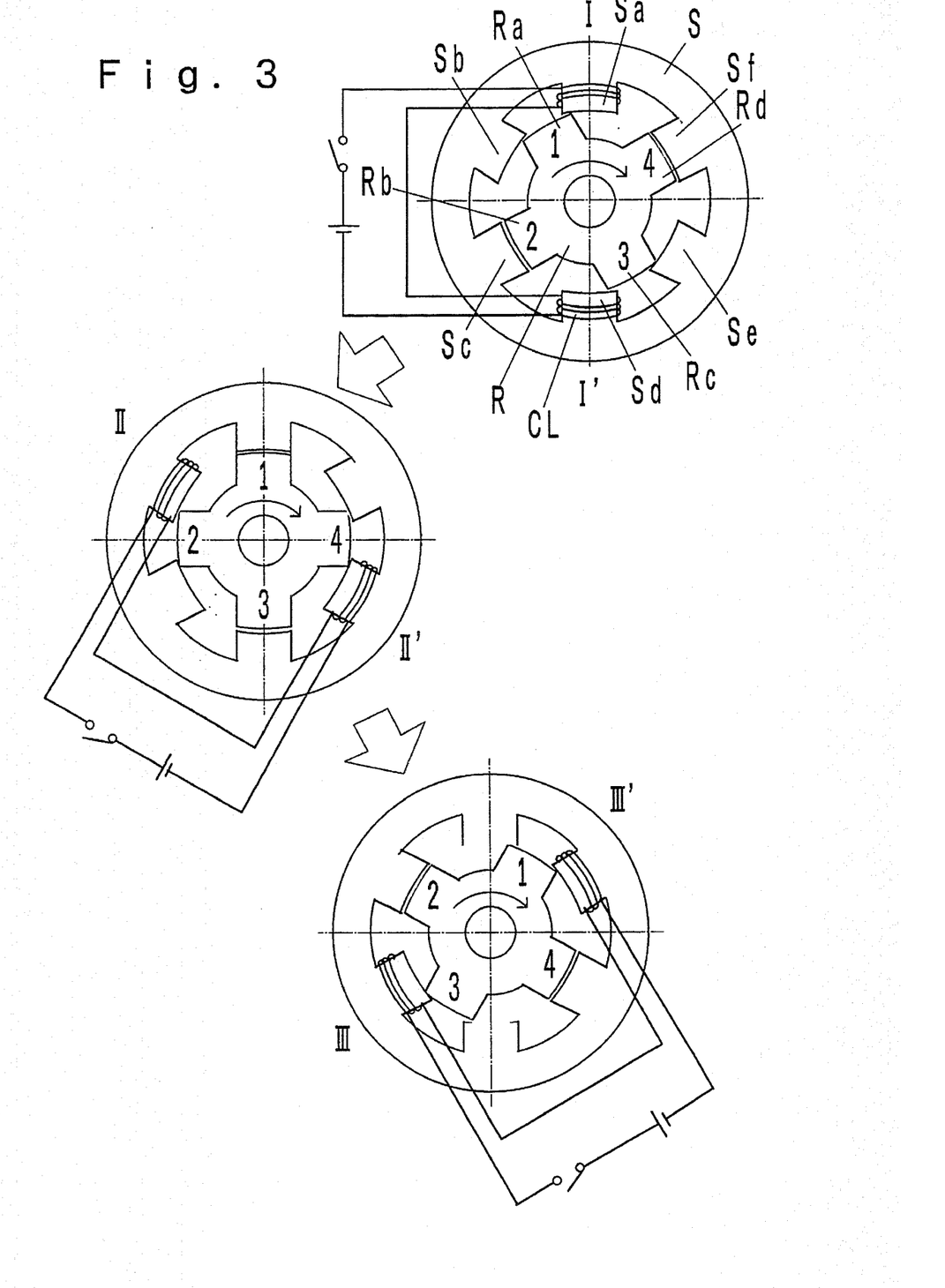
FIG. 3 is a series of illustrations of a basic internal construction and an operation of an SR motor used in the embodiment.

As an example, FIG. 3 shows that a rotor (R) includes four poles (Ra, Rb, Rc, Rd) and a stator (S) includes six poles (Sa, Sb, Sc, Sd, Se, Sf), thus constructing an SR motor. This motor can be driven with a maximum efficiency by turning coils (1a, 1b, 1c) on and off for each rotation through 30° of the rotor. By way of example, during the time the motor transits from a condition shown in the uppermost portion to another condition shown in the median position of FIG. 3, only the coils of a first phase (that is, coils disposed around Sa, Sd) are energized. On the other hand, during the transition from the condition shown in the median position to the condition shown in the lowermost position of FIG. 3, only coils associated with the second phase (that is, coils disposed around Sb and Se) are energized. Finally, during the transition from the lowermost to the uppermost position of FIG. 3, only coils of a third phase (that is, coils disposed around Sc and Sf) are energized. By repeating the switching sequence of the energization, a drive in the clockwise direction can be generated.

However, as mentioned above, when the energization of coils is switched at a particular, predetermined position, both the rotor and the stator are subject to a continuous mechanical oscillation having a given period in synchronism with such switching operation. Because such oscillation has a fixed period, if the natural frequency of parts such as rotor which are used to construct the SR motor coincides with the frequency of the mechanical oscillation which results from the switching of the energization, there occurs a resonance, which generates noises of a very high level.

Figure 11:
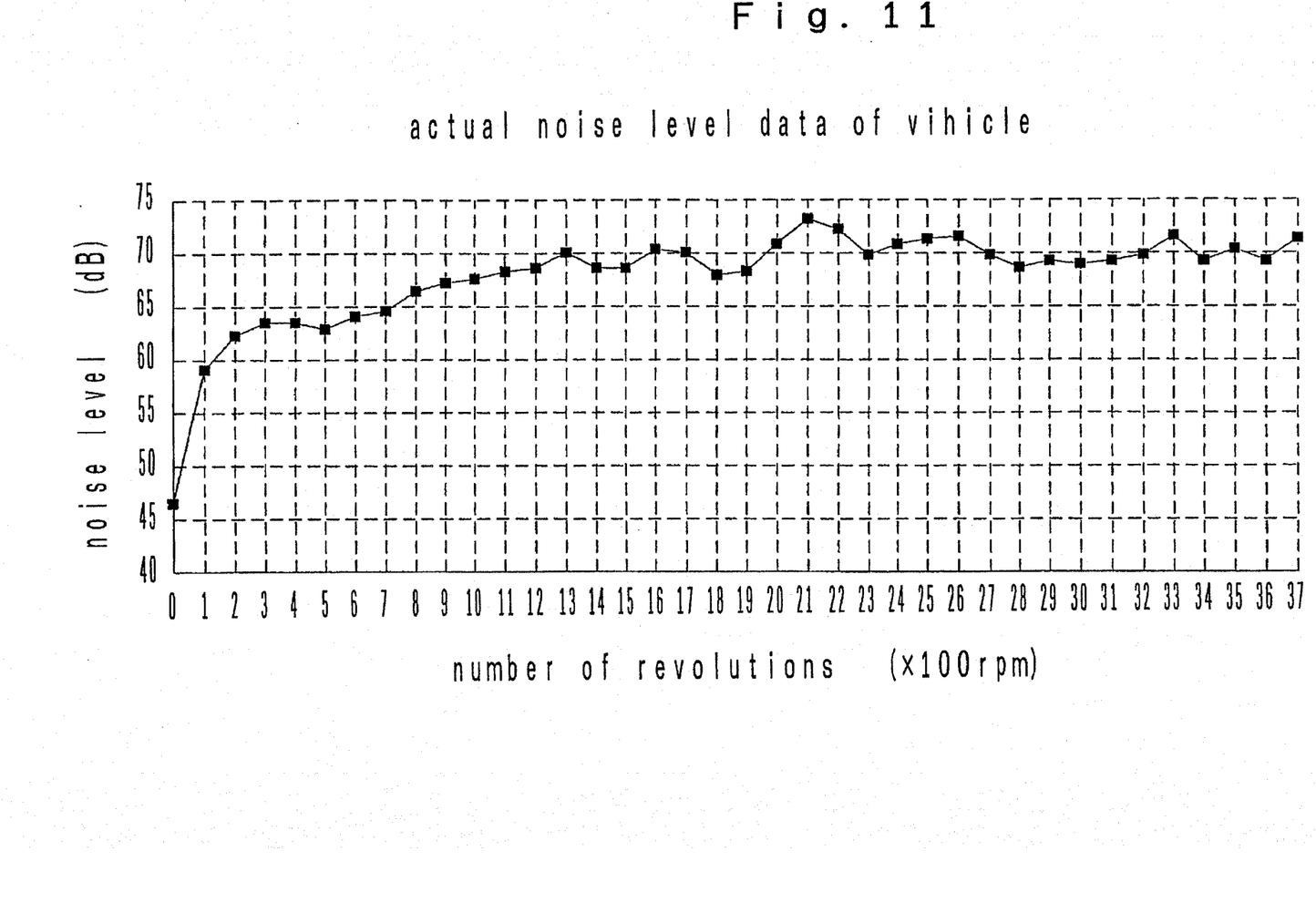
FIG. 11 graphically shows a noise level of an SR motor when it is driven according to a conventional control.

FIG. 11 depicts a result of an actual measurement of a relationship between the number of revolutions (rpm) of SR motor and a noise level. Referring to this Figure, it will be seen that noises of very high levels are generated in the proximity of the numbers of revolutions of 2100, 2600 and 3300 (rpm). Denoting the number of revolution by ω (rpm) where a peak in the noise level occurs, the frequency f of the mechanical oscillation which occurs in the SR motor shown in FIG. 3 as a result of the switching of energization every 30° is expressed as follows:

$$(\omega/60) \times (360/30) = f \tag{1}$$

The frequency f which is determined from this equation has been recognized to coincide with an actual natural frequency or resonant frequency of the SR motor.

Accordingly, it is seen that it is possible to suppress the noise level by controlling the number of revolutions such that the frequency f of the mechanical oscillation which results from the switching of the energization of the electrical coils be offset from the natural frequency fc of the SR motor. However, when such SR motor is utilized as a drive source for an electric car, for example, it is necessary that the car be driven at any desired number of revolutions in accordance with the accelerating and decelerating operation, so that the use of the number of revolutions (rpm) must be allowed if it causes the oscillation at the frequency fc.

To accommodate for this, in accordance with the invention, an offset is provided between the position where the coils are turned on and off and the particular rotational position, and the magnitude of such offset is periodically modified. In this manner, the timing with which the switching of the energization of the coils takes place periodically varies in accordance with the offset if the SR motor is driven at a given number of revolutions, thus allowing the frequency of the mechanical oscillation which is produced within the SR motor to be varied continuously. Consequently, if certain components of the mechanical oscillation may temporarily coincide with the frequency fc, such component cannot exist continuously. This prevents occurrence of a resonance, thereby suppressing the peak noise level.

In a preferred embodiment of the invention, an offset between the particular rotational position and the position where the energization of the coils is actually turned on or off is determined in a range defined by limit values for the offset which are predetermined by random number generating means (69, 6A). When the offset is determined in terms of random numbers, it is assured that the magnitude of the offset be positively varied. When the magnitude of the offset increases, the efficiency will be reduced, which in turn results in a reduction in the driving torque, but when the offset is determined in a range defined by predetermined limit values, such reduction in the efficiency can be minimized.

In a more preferred embodiment of the invention, the predetermined limit values for the offset are determined on the basis of the rotational speed of the rotor which is detected by the speed detecting means. Since a rate of reduction in the driving efficiency or an allowance thereof varies with the rotational speed or a target drive torque of the motor, it is possible to suppress a reduction in the drive torque within a permissible range while simultaneously reducing the noise level to a satisfactory degree, by changing the limit values in accordance with the rotational speed and the target drive torque.

Other objects and features of the invention will become apparent from the following description of an embodiment thereof.

DETAILED DESCRIPTION OF A PREFERRED EMBODIMENT

Figure 1:
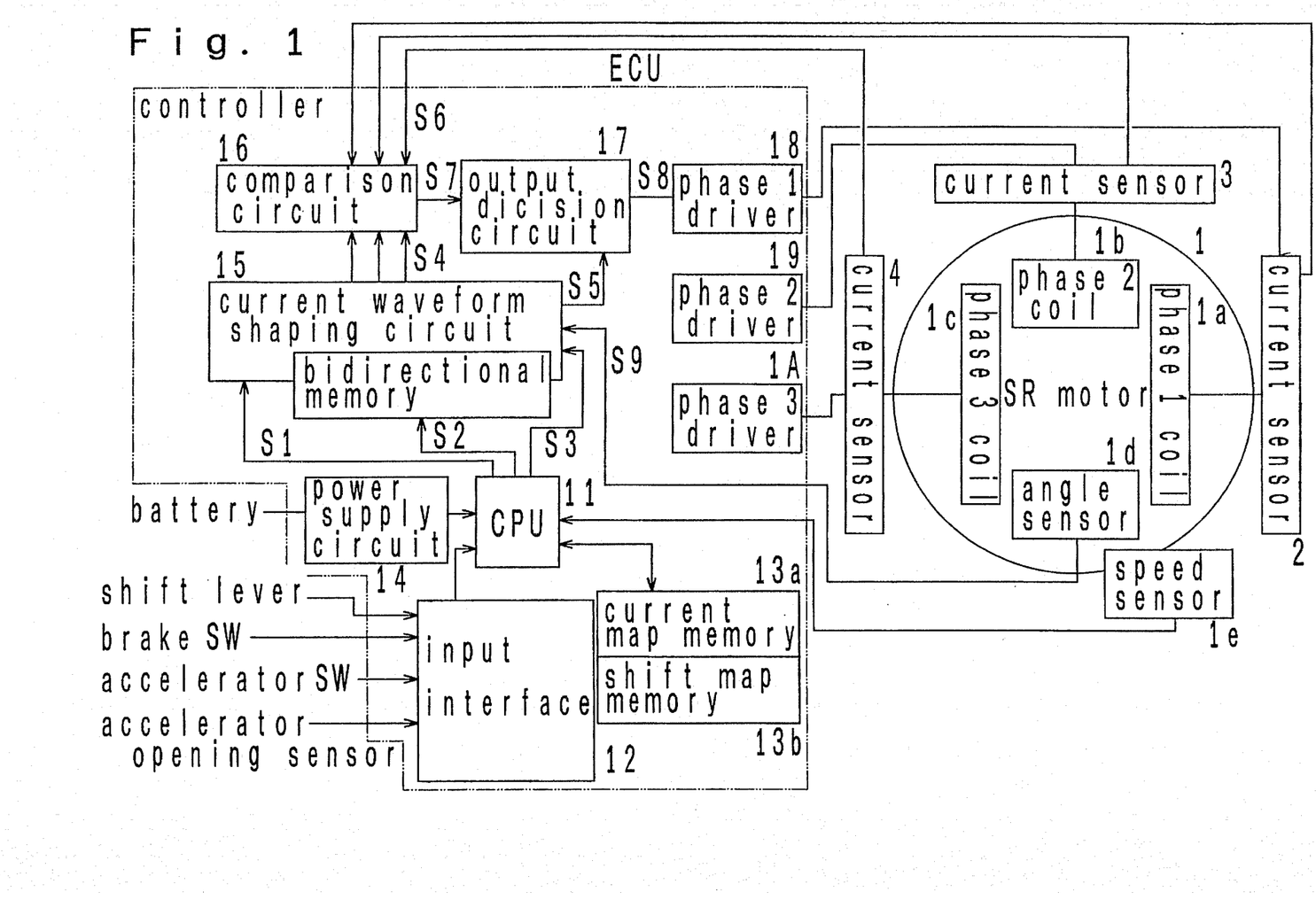
FIG. 1 is a block diagram of an apparatus according to one embodiment of the invention.

The general arrangement of the embodiment shown in FIG. 1 constitutes an essential portion of a drive unit for an electric car. In this example, a single SR motor 1 is provided as a drive source, and is controlled by a controller ECU. The controller ECU controls the drive of the SR motor 1 on the basis of information which is input from a shift lever, a brake switch, an accelerator switch and an accelerator opening sensor.

A basic construction of the SR motor 1 and the principle of its drive are illustrated in FIG. 3. The SR motor 1 shown in FIG. 3 comprises a stutor S and a rotor R which is rotatably disposed therein. The rotor R comprises a lamination of a number of thin iron laminae, and is formed with four salient poles Ra, Rb, Rc and Rd which project radially outward at locations spaced apart 90° around the circumference thereof. The stator S also comprises a lamination of a number of thin iron laminae, and is formed with six poles Sa, Sb, Sc, Sd, Se and Sf which project radially inward at locations spaced apart 60° around the inner periphery thereof. It is to be understood that each of the poles Sa, Sb, Sc, Sd, Se and Sf of the stator S has an electrical coil CL disposed thereon, even though such coils are only partly shown in FIG. 3.

Designating coils CL disposed on the poles Sa, Sd of the stator S as a first phase, coils CL disposed on the poles Sb, Se as a second phase, and the coils CL disposed on the poles Sc, Sf as a third phase, by sequentially energizing the coils CL in the sequence of the first, the second and the third phase as shown in FIG. 3, depending on the position assumed by the poles on the rotor R, the rotor R can be continuously driven for clockwise rotation. Since the energized pole on the stator S acts as an electromagnet, the pole on the rotor R which is located adjacent to the electromagnet is attracted for a rotational motion. To continue such rotation, it is necessary to switch the energization of the coils as the rotor R moves rotatively. In actuality, for the SR motor 1 shown, the coils which are to be energized may be sequentially switched in the sequence of the first, the second and the third phase for every rotation of the rotor R through 30°.

Returning to FIG. 1, in addition to the three phase coils 1a, 1b, 1c which are used for driving purpose, the SR motor 1 is provided with an angle sensor 1d which detects the rotational position (or angle of rotation) of the rotor R, and a speed sensor 1e which detects the rotational speed. The three phase coils 1a, 1b and 1c are connected to drivers 18, 19 and 1A contained within the controller ECU, and current sensors 2, 3 and 4 are connected in signal lines which connect the coils 1a, 1b and 1c with the drivers 18, 19 and 1A, respectively. Each of these current sensors 2, 3 and 4 provides a voltage proportional to the actual current flow through each of the coils 1a, 1b and 1c as a current signal S6.

The controller ECU internally contains a CPU (microcomputer) 11, an input interface 12, a current map memory 13a, a shift map memory 13b, a power supply circuit 14, a current waveform shaping circuit 15, a comparison circuit 16, an output decision circuit 17 and drivers 18, 19 and 1A.

On the basis of information which is input from the shift lever, brake switch, accelerator switch and accelerator opening sensor, the controller ECU sequentially calculates the driving speed and the drive torque of the SR motor 1, and controls the current which is to be fed to each of the coils 1a, 1b and 1c of the SR motor 1 in accordance with the result of such calculation.

Figure 2:
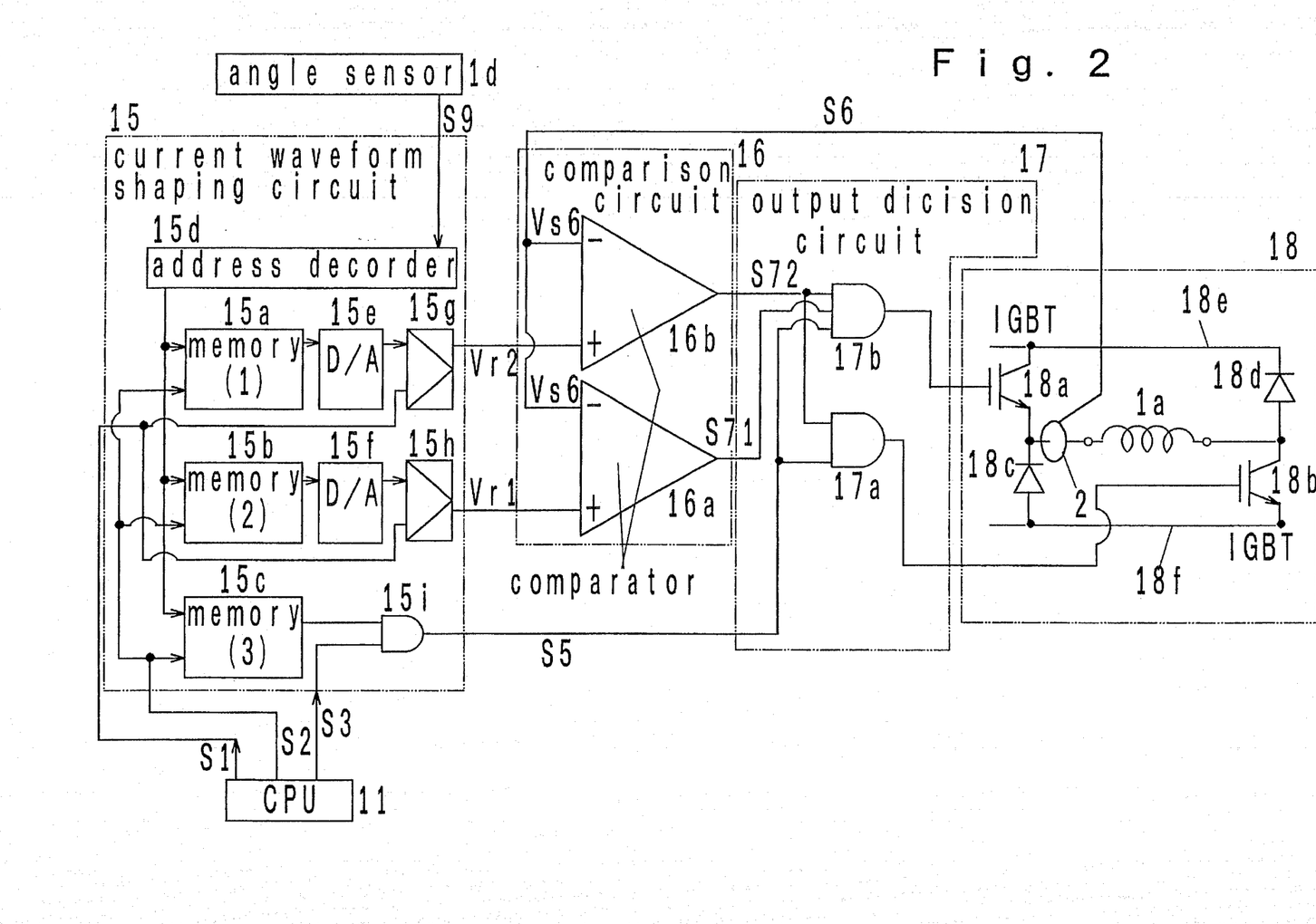
FIG. 2 is a block diagram of a specific example of a major portion shown in FIG. 1.

A specific arrangement of a major portion of the circuit shown in FIG. 1 is indicated in FIG. 2. It is to be understood that FIG. 2 shows only the circuit which controls the energization of the coil 1a of the SR motor 1, but that similar circuits controlling the energization of the other coils 1b and 1c are also contained therein.

Referring to FIG. 2, the coil 1a has its one end connected to a high potential line 18e of the power supply through a switching transistor (IGBT) 18a while the other end of the coil is connected to a low potential line 18f of the power supply through a switching transistor (IGBT) 18b. A diode 18c is connected between the emitter of the transistor 18a and the low potential line 18f, and a diode 18d is connected between the emitter of the transistor 18b and the high potential line 18e. Accordingly, when both transistors 18a and 18b are turned on, there is produced a current flow between the power supply lines 18e, 18f through the coil 1a, and when either or both of these transistors are turned off, the energization of the coil 1a can be interrupted.

The output decision circuit 17 includes a pair of AND gates 17a, 17b, and the output terminal of the gate 17a is connected to the gate terminal of the transistor 18b, while the output terminal of the gate 17b is connected to the gate terminal of the transistor 18a. Signals S72 and S5 are input to the gate 17a, while signals S71, S72 and S5 are input to the gate 17b. Signals S71 and S72 are binary signals which are output from analog comparators 16a, 16b in the comparison circuit 16. Signal S5 is also a binary signal which is output from the current waveform shaping circuit 15.

The comparison circuit 16 includes the pair of analog comparators 16a and 16b. The comparator 16a compares the voltage level of the signal S6 corresponding to the current flow detected by the current sensor 2 against a first reference voltage Vr1 which is output from the current waveform shaping circuit 15, thereby providing the binary signal S71 as an output. The comparator 16b compares the voltage level of the signal S6 corresponding to the current flow detected by the current sensor 2 against a second reference voltage Vr2 which is output from the current waveform shaping circuit 15, thereby providing the binary signal S72 as an output. In this embodiment, the inequality Vr1<Vr2 applies.

When the signal S5 assumes a high level H, the status of the transistors 18a, 18b in the driver 18 is governed by one of three conditions mentioned below, depending on the relative magnitude of the voltage Vs6 of the signal S6 and the reference voltages Vr1 and Vr2. Specifically, if Vs6<Vr1, the signals S71 and S72 both assume a high level H and hence the outputs from the gates 17a and 17b are at their high level H, whereby the both transistors 18a and 18b are turned on. If Vr2<Vs6, the signals S71 and S72 both assume a low level L, and accordingly the outputs from the gates 17a and 17b are at their low level L, whereby the transistors 18a and 18b are both turned off. If Vr1<Vs6<Vr2, the signal S71 assumes a low level L while the signal S72 assumes a high level H, and accordingly the output from the gate 17a is at its high level H while the output from the gate 17b is at its low level L, whereby the transistor 18a is turned off while the transistor 18b is turned on.

Thus, there are three conditions, namely, one where the transistors 18a and 18b are both on, another where they are both off and a further one where one of the transistors is on while the other is off, depending on the level of Vs6 which may be less than Vr1, between Vr1 and Vr2 or greater than Vr2.

When the signal S5 assumes a low level L, the outputs from the gates 17a and 17b are both at their low level, independently from the status of the signals S71 and S72 which are output from the comparison circuit 16, and accordingly the transistors 18a and 18b are both turned off.

The rising characteristic of the current which flows through the coil 1a when the transistors 18a and 18b are both turned on is determined by the time constant of the circuit and cannot be changed by a control. However, when the current flow is to be interrupted, the falling characteristic (falling rate) of the current is different between when the transistors 18a and 18b are both turned off and when the transistor 18a is turned off while the transistor 18b remains on. Accordingly, the falling rate of the current flow may be adjusted by such switching operation. In other words, when the transistors 18a and 18b are both turned off, a change in the current occurs rapidly, but the current changes more slowly when the transistor 18a is turned off while the transistor 18b remains on.

When there is little change in the target values (Vr1, Vr2) of the current, there is no increase in the offset between the reference level (Vr1) and the actual current level (Vs6) if the falling rate of the current is low, thus maintaining the inequality Vs6<Vr2. In such instance, a variation in the current is small. When the target values (Vr1, Vr2) of the current is modified as when switching from one phase to another phase, a low falling rate of the current results in Vs6>Vr2. In this instance, the both transistors 18a and 18b are turned off, whereby the falling rate of the current increases, and the current changes rapidly in following relationship with the target values (Vr1, Vr2). If a change in the target values is removed, the offset between the reference voltage Vr1 and the current level Vs6 is reduced, whereby the falling rate of the current again becomes lower.

In this manner, not only a tracking lag in the current with respect to a change in the target value can be prevented, but whenever a change in the target values is small, the resulting low rate of change in the current is effective to suppress the generation of oscillation and noises.

When the falling rate of the current is switched by the signals S71 and S72 which are output from the comparison circuit 16 shown in FIG. 2, there is a tendency that the actual switching slightly lags behind the optimum timing for the switching. It is ideal that the falling rate of the current be increased at the time when the target values are reduced rapidly. However, unless the offset in the current becomes high, the signal S72 cannot assume a low level L, and this explains for a time lag. Because of this, where the target values are changing very rapidly, an automatic switching of the changing rate by means of the signals S71 and S72 alone may be insufficient to achieve the tracking capability of the current with respect to the target values.

To take this into account, in the present embodiment, by controlling the signal S5, the falling rate of the current may be increased independently from the magnitude of the current (Vs6). Specifically, when the signal S5 is brought to its low level L, the transistors 18a and 18b are simultaneously turned off independently from the signals S71 and S72, whereby the falling rate of the current can be increased.

Referring to FIG. 2, the current waveform shaping circuit 15 delivers the pair of reference voltages Vr1, Vr2 and the binary signal S5, all of which are produced on the basis of information stored in memories (RAM) 15b, 15a and 15c, respectively. The memories 15b, 15a and 15c store eight bit, eight bit and one bit data, respectively, at each address. Eight bit data which is read from the memory 15a is converted into an analog voltage by means of D/A converter 15e, and thence passed through an amplifier 15g to provide the reference voltage Vr2. Similarly, eight bit data read from the memory 15b is converted into an analog voltage by means of D/A converter 15f, and thence passed through an amplifier 15h to provide the reference voltage Vr1. The level of an analog signal S1 which is output from CPU 11 is applied to an input of each of the amplifiers 15g and 15h for purpose of addition. A fine adjustment of the reference voltages Vr1 and Vr2 is possible by adjusting the level of the signal S1. One bit data which is output from the memory 15c is passed through AND gate 15i to provide the signal S5. A binary signal (start/stop signal) S3 which is output from CPU 11 is applied to one input of the gate 15i. When the SR motor 1 is being driven, the signal S3 normally assumes a high level H, whereby the output signal from the memory 15c is directly effective as the binary signal S5.

Each of the memories 15a, 15b, 15c has a number of addresses, each of which corresponds to the rotational position (angle of rotation) of the rotor R in unit of one degree. An address decoder 15d forms address information from a signal S9 representing the rotational position of the rotor which is detected by the angle sensor 1d. The address information is simultaneously input to the address input of each of the three memories 15a, 15b and 15c. Accordingly, as the SR motor 1 rotates, each of the memories 15a, 15b and 15c sequentially outputs data which is stored at an address corresponding to the rotational position of the rotor. In this manner, the reference voltages Vr1, Vr2 and the binary signal S5 can be changed for each rotational position.

Figure 4:
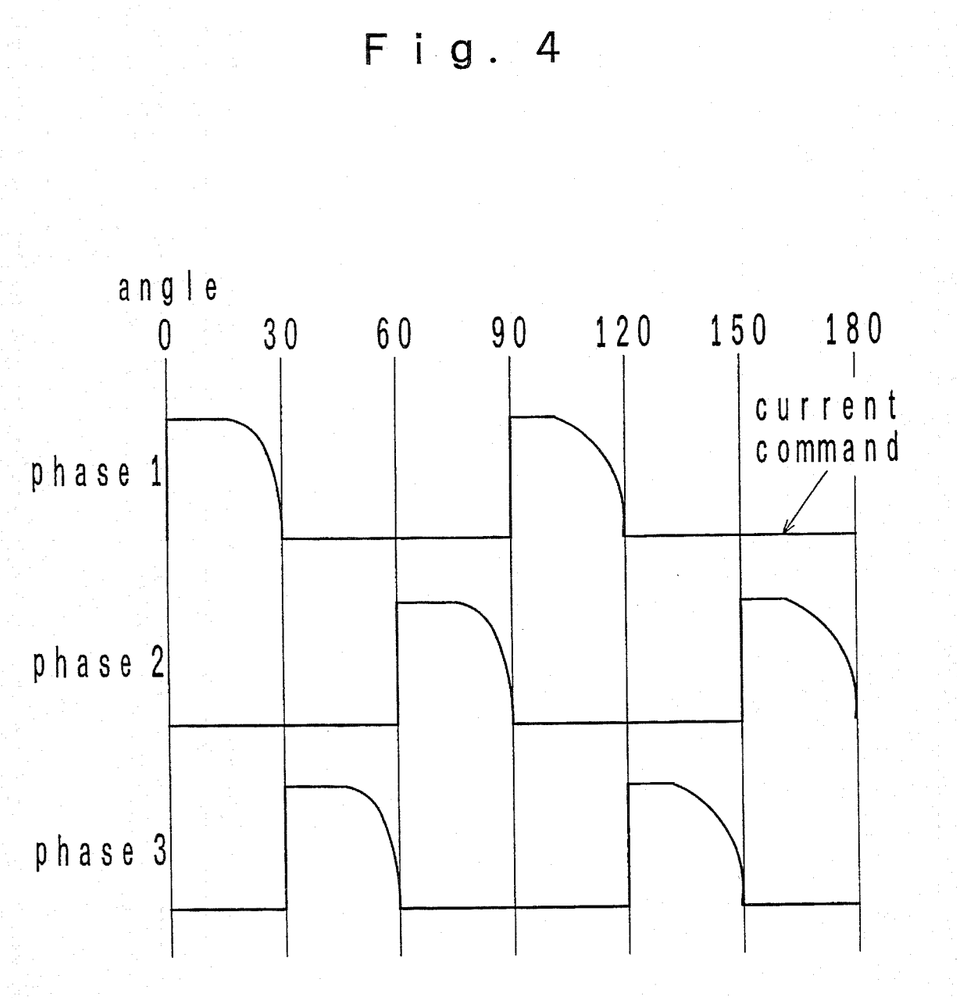
FIG. 4 is a timing chart showing examples of waveforms of an energizing current command which is used to drive the SR motor in the embodiment.
Figure 5:
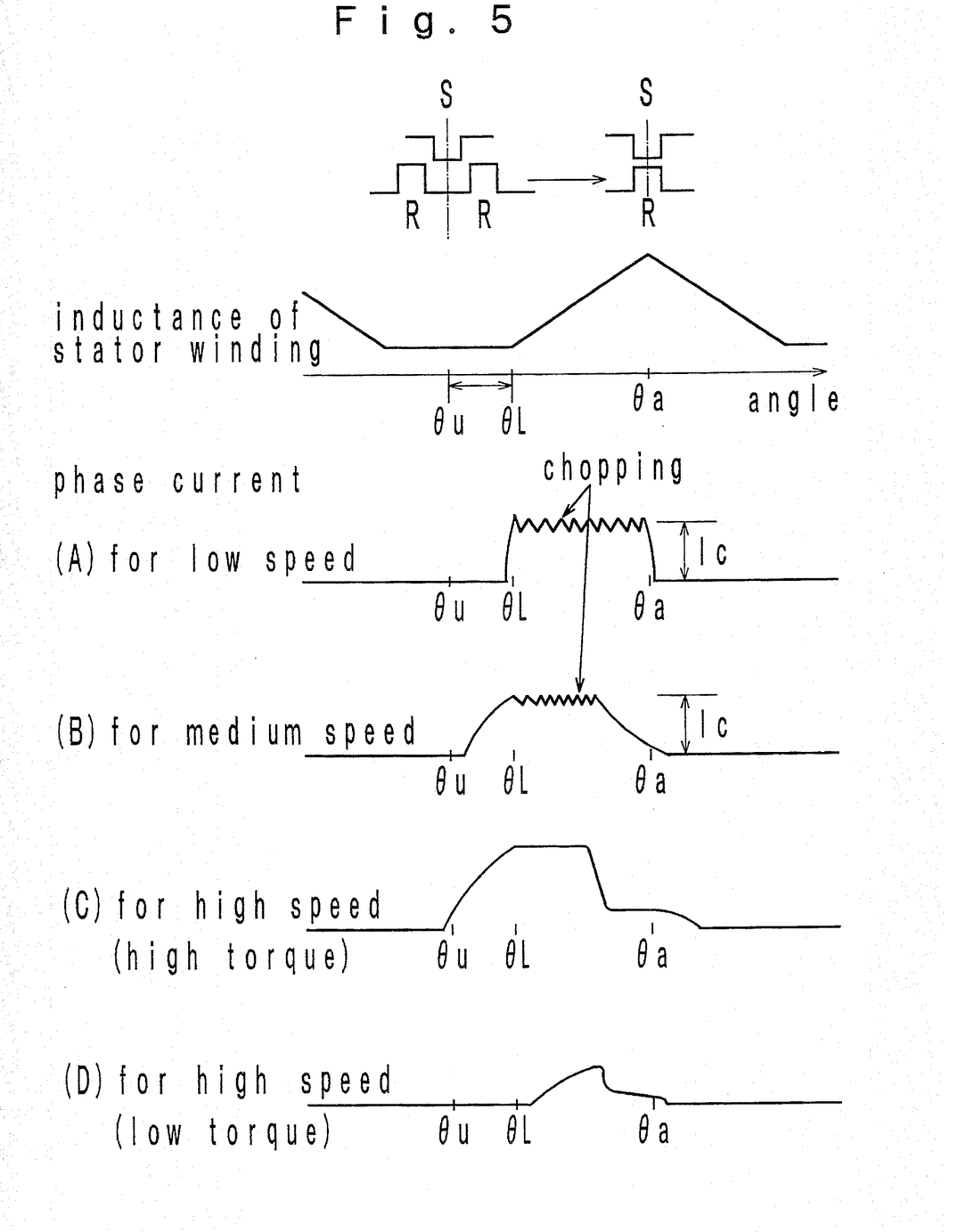
FIG. 5 is a series of timing charts illustrating a change in the current command fed to the SR motor in accordance with driving conditions.
Figure 8:
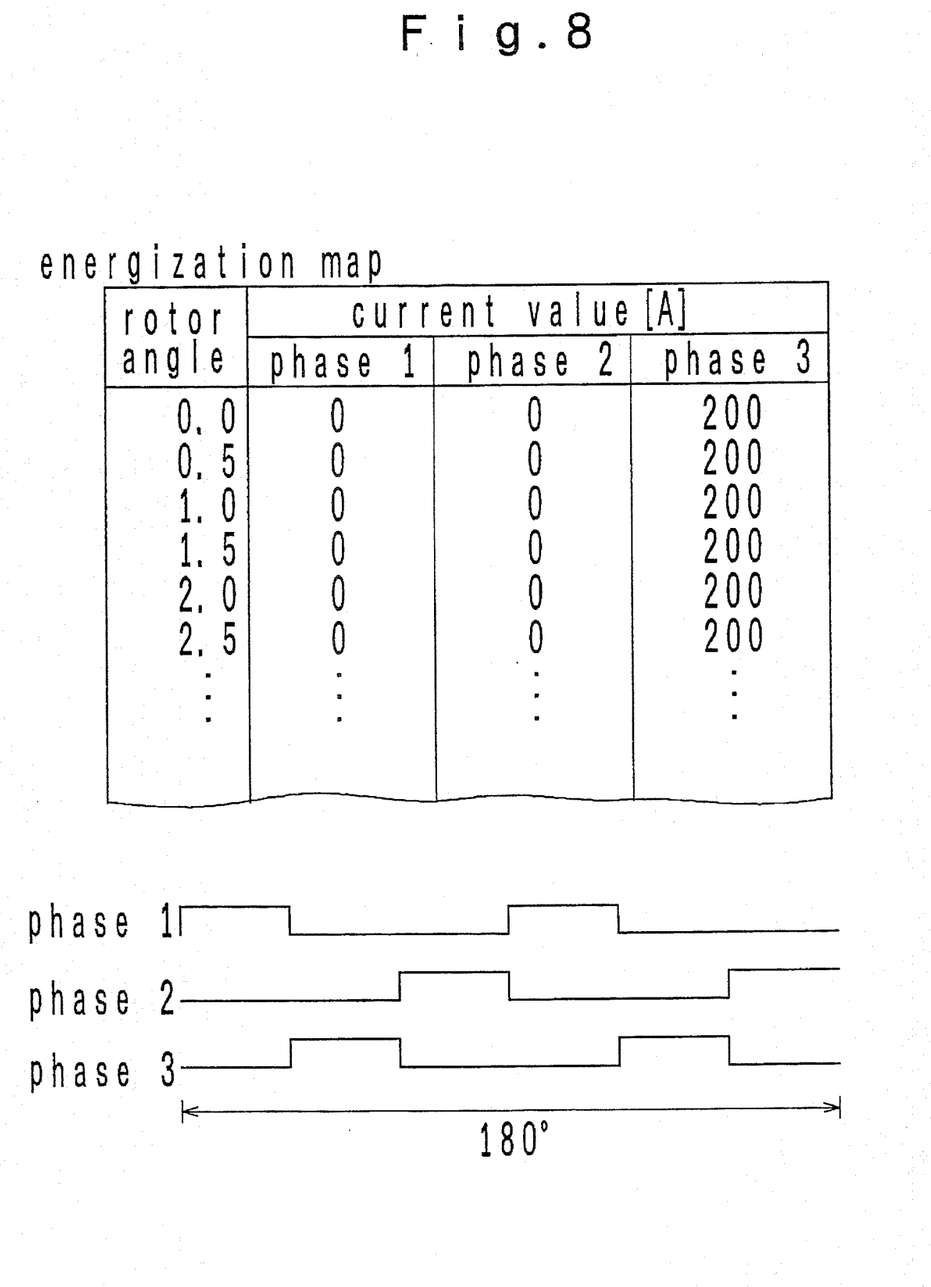
FIG. 8 more specifically illustrates the content of the current map memory.

In actuality, each of the memories 15a and 15b stores energization map information as indicated in FIG. 8 in order to pass currents having waveforms as indicated in FIG. 4 through the three phase coils. Specifically, a target value of current which is to be established at that position is stored at an address which corresponds to each of the rotational positions (which are defined at an interval of 0.5° in this example). Since information stored in the memories 15a and 15b correspond to the reference voltages Vr2 and Vr1, respectively, the content stored in the memory 15a and the content stored in the memory 15b are slightly different from each other so that the inequality Vr2>Vr1 is satisfied. As mentioned previously, the current level passed through the coil 1a varies in tracking relationship with the reference voltage Vr1, and accordingly, by registering the waveforms of currents which are to be passed through the coil 1a as reference voltages Vr1, Vr2 in the memories 15b, 15a, the currents as shown in FIG. 4 may be passed.

In this embodiment, it is necessary to switch the energization of the three phase coils 1a, 1b and 1c for each rotation of the rotor through 30°, as indicated in FIG. 4. However, by registering the waveforms as shown in FIG. 4 in the memories 15b and 15a, the switching of the energization every 30° rotation can be automatically performed in terms of the signals S71 and S72. In other words, there is no need for CPU 11 to switch the energization of the respective coils.

The memory 15c stores "1" information corresponding to a high level H of the signal S5 at most addresses, but stores "0" information (forced interruption information) corresponding to the low level L of the signal S5 at an address which corresponds to the angle where the target values (Vr1, Vr2) of the current are reduced rapidly. Thus, for a rotational position where the falling gradient is severe and accordingly where it is expected that the choice of a higher rate in the change of the current is preferable, such as the point where the waveform of the target values (Vr1, Vr2) of the current start to fall, the signal S5 is switched to a low level by means of information stored in the memory 15c, without resort to the automatic switching by means of the signal S72, thus forcibly increasing the rate of changing the current. In this manner, the occurrence of a time lag in the switching of the rate of change in the current can be avoided, further improving the tracking capability of the current with respect to the target value.

Each of the memories 15a, 15b and 15c can be written into and read out, and also capable of performing a write-in and read-out simultaneously. The memories 15a, 15b and 15c are connected to CPU 11 through a signal line S2, and CPU 11 updates the content of the memories 15a, 15b and 15c as required.

Figure 6:
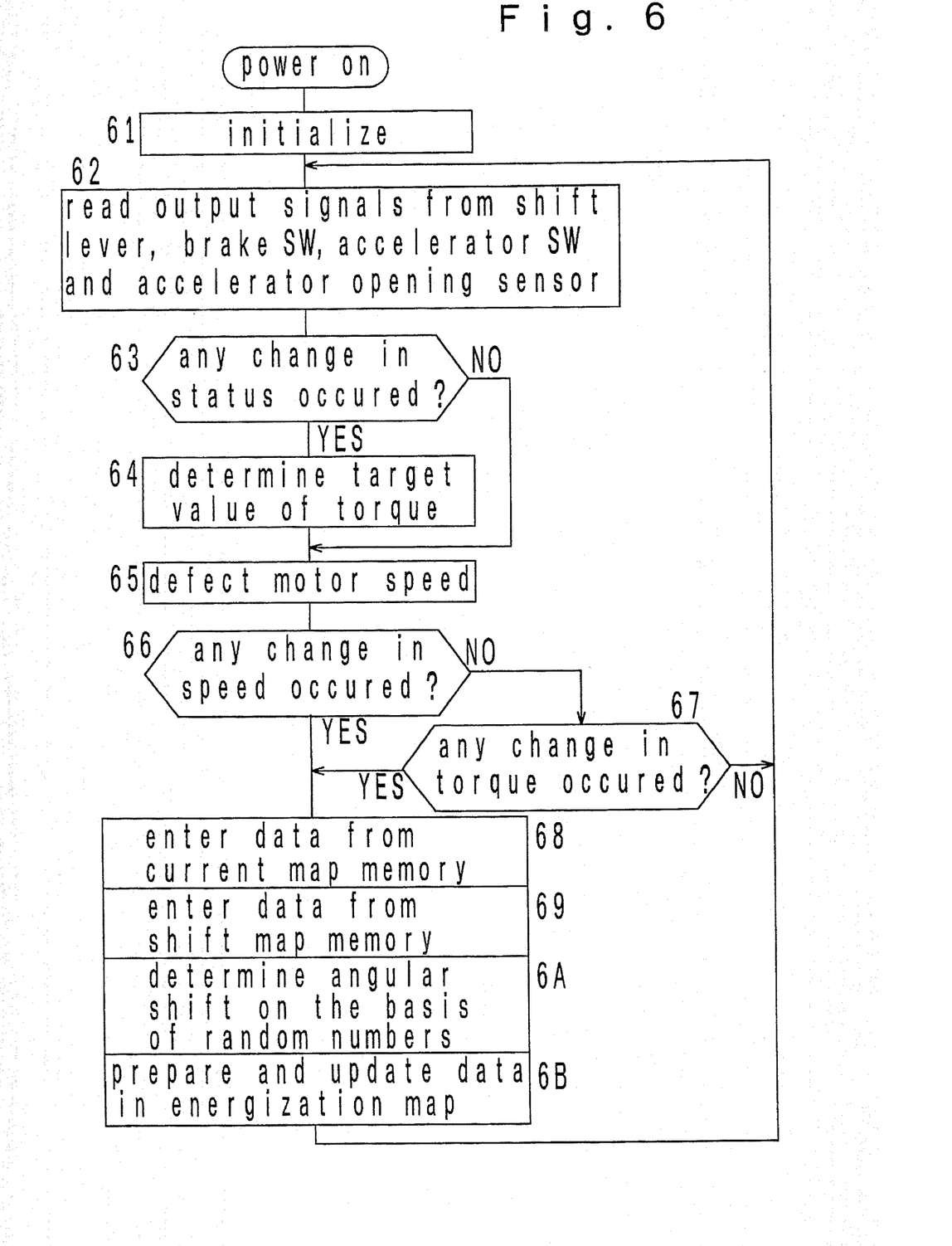
FIG. 6 is a flow chart, showing the operation of CPU 11 shown in FIG. 1.

The operation of CPU 11 is schematically illustrated by a flow chart in FIG. 6. Referring to FIG. 6, when the power supply is turned on, an initialization is executed at step 61. Specifically, internal memories within CPU 11 are initialized, and the internal timers and interrupt mode or the like are set up, the system diagnosis is implemented, and if no abnormality is found, the operation proceeds to the next step.

At step 62, the status of various signals which are output from the shift lever, the brake switch, the accelerator switch and the accelerator opening sensor are read through the input interface 12, and corresponding data is saved in internal memories. When a change in the status detected at step 62 occurs, the program proceeds from step 63 to step 64. Otherwise, the program proceeds from step 63 to step 65.

At step 64, a target value for the drive torque of the SR motor 1 is determined on the basis of various status detected at step 62. For example, when an accelerator opening detected by the accelerator opening sensor increases, the target value for the drive torque also increases. A torque modify flag (indicating a change in the target torque) is set at this point.

At step 65, the rotational speed of the SR motor 1 is detected. In this embodiment, the speed sensor 1e connected to the drive shaft of the SR motor 1 delivers a pulse signal having a period which varies in accordance with the rotational speed of the drive shaft. CPU 11 determines the pulse period of the signal delivered from the speed sensor 1e, and detects the rotational speed of the SR motor 1 on the basis of such period. Data representing the detected rotational speed is saved in an internal memory.

If a change occurs in the rotational speed of the SR motor 1, the program proceeds from step 66 to step 68, and otherwise, the program proceeds to step 67. At step 67, the status of a force modify flag is examined, and if it is set, indicating the presence of a change in the target torque, the program proceeds to step 68, and otherwise the program returns to step 62.

Figure 7:
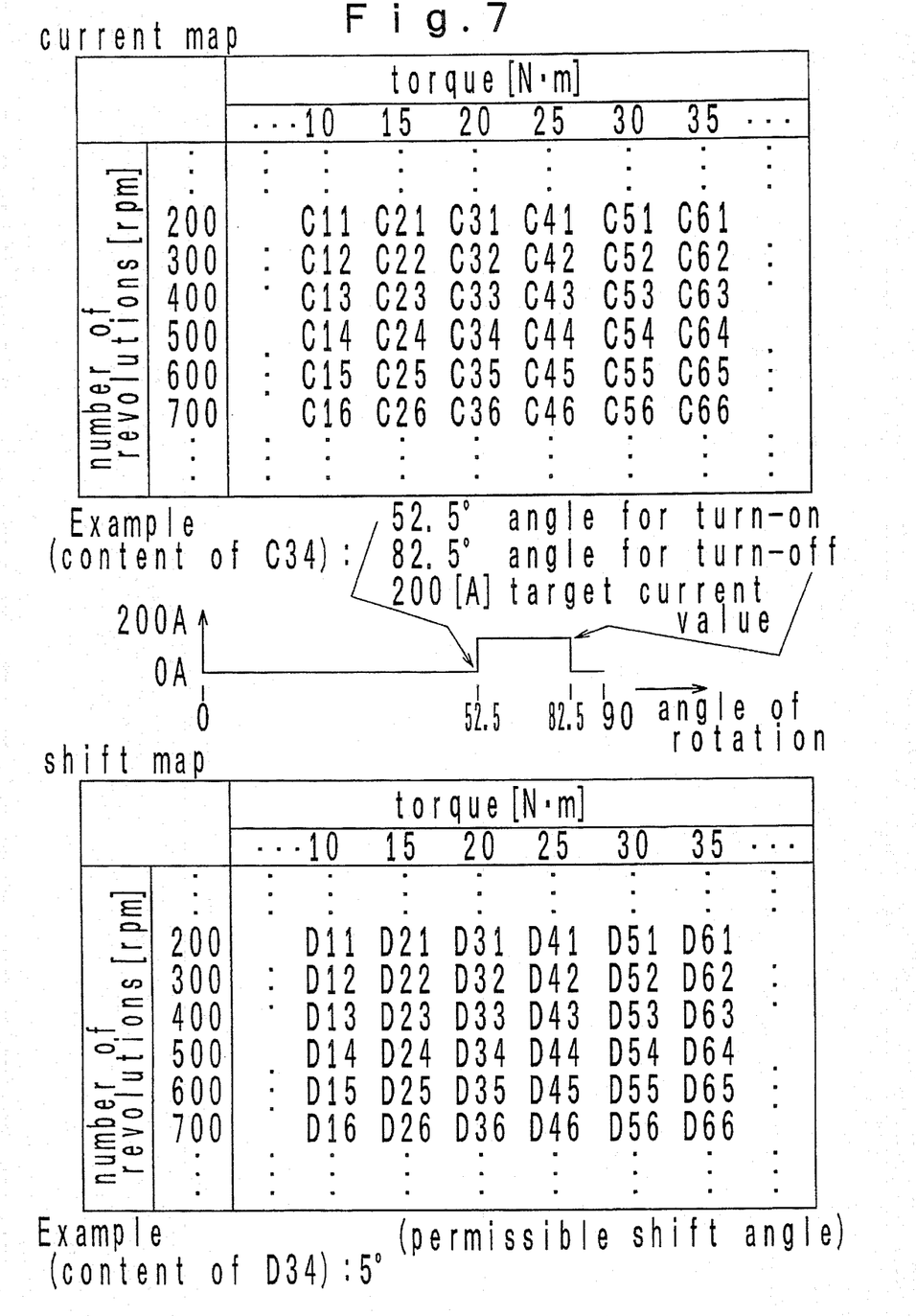
FIG. 7 is a chart showing the content of a current map memory and a shift map memory.

At step 68, data is entered from a current map memory 13a, and at next step 69, data is entered from a shift map memory 13b. In the present embodiment, both the current map memory 13a and the shift map memory 13b are constructed with read-only memories (ROM's) in which various data are previously registered. FIG. 7 indicates data which are saved in the current map memory 13a and the shift map memory 13b.

Specifically, the current map memory 13a saves a multitude of data Cnm (where n represents a column number corresponding to the torque while m represents a raw number corresponding to the number of revolutions) which corresponds to various values of target torques and the number of revolutions, which may be considered as the rotational speed of the motor. One set of data Cnm contains a turn-on angle, a turn-off angle and a target current value. For example, data C34 which corresponds to a torque of 20 (N·m) and the number of revolutions of 500 (rpm) conains, as its content, the values of 52.5°, 82.5° and 200 (A) . This means that for rotational positions located in a range from 0° to 90°, a current of 200 A is passed through a particular coil over an angle range from 52.5° to 82.5° and that the current flow is interrupted over angle ranges from 0° to 52.5° and from 82.5° to 90°. At step 68, one set of data Cnm which is selected in a manner corresponding to the prevailing torque and the number of revolutions is entered.

The shift map memory 13b contains a multitude of data Dnm (where again n represents a column number corresponding to a torque while m represents a raw number corresponding to a number of revolutions) which correspond to various values of target torques and numbers of revolutions (which may be considered as the rotational speed of the motor). One set of data Dnm contains data representing a permissible shift angle. For example, a permissible shift angle for data D34 which corresponds to a torque of 20 (N.m) and a number of revolutions of 500 (rpm) is equal to 5°. A single Dnm item is entered to CPU 11 from the shift map memory 13b at step 69.

At the following step 6A, random numbers are generated in accordance with a known random number generating algorithm for determining an angular shift. However, the random numbers generated are limited to lie within the permissible shift angle which is entered from the shift map memory 13b during the previous step 69. This angular shift signifies an offset of the actual angles where the energization is initiated and terminated with respect to reference values of such angles for each coil.

When driving the SR motor, the energization of electrical coils are switched at a particular rotational position so that the rotation of the rotor occurs most efficiently under the prevailing operating conditions. For example, considering that the uppermost portion of FIG. 3 represents a rotational position of 0°, the median portion 30° and a lowermost portion 60°, it follows that the rotor can be continuously rotated by switching the turn on/off of the respective coils at particular rotational positions of 0°, 30°, 60°, 90°, . . . as indicated in FIG. 4. Information which represents such particular rotational position is saved in the current map memory 13a, and is entered at step 68.

Considering data C34 corresponding to a drive torque of 20 (N·m) and a number of revolutions of 500 (rpm) by way of example, this means that the turn-on angle for a particular rotational position is equal to 52.5° and a turn-off angle is equal to 82.5°. Accordingly, the motor can be most efficiently driven by turning on the first phase coil for an angular range from 52.5° to 82.5° and turning it off for angular ranges from 0° to 52.5° and from 82.5° to 90°, and similarly switching the second and the third phase coils with an angle offset of 30° and 60°, respectively, with respect to the first phase coil.

However, when the energization is regularly switched at a given anglular interval (which is 30° in this example) as mentioned above, a mechanical oscillation which corresponds to such switching period occurs in various parts of the SR motor 1 as a result of the switching of the energization, and where the number of revolutions remains constant, the oscillation will be of a given frequency, causing the likelihood that a resonance would occur to produce noises of considerable levels if the oscillation frequency coincides with the natural frequency of the SR motor.

Figure 9:
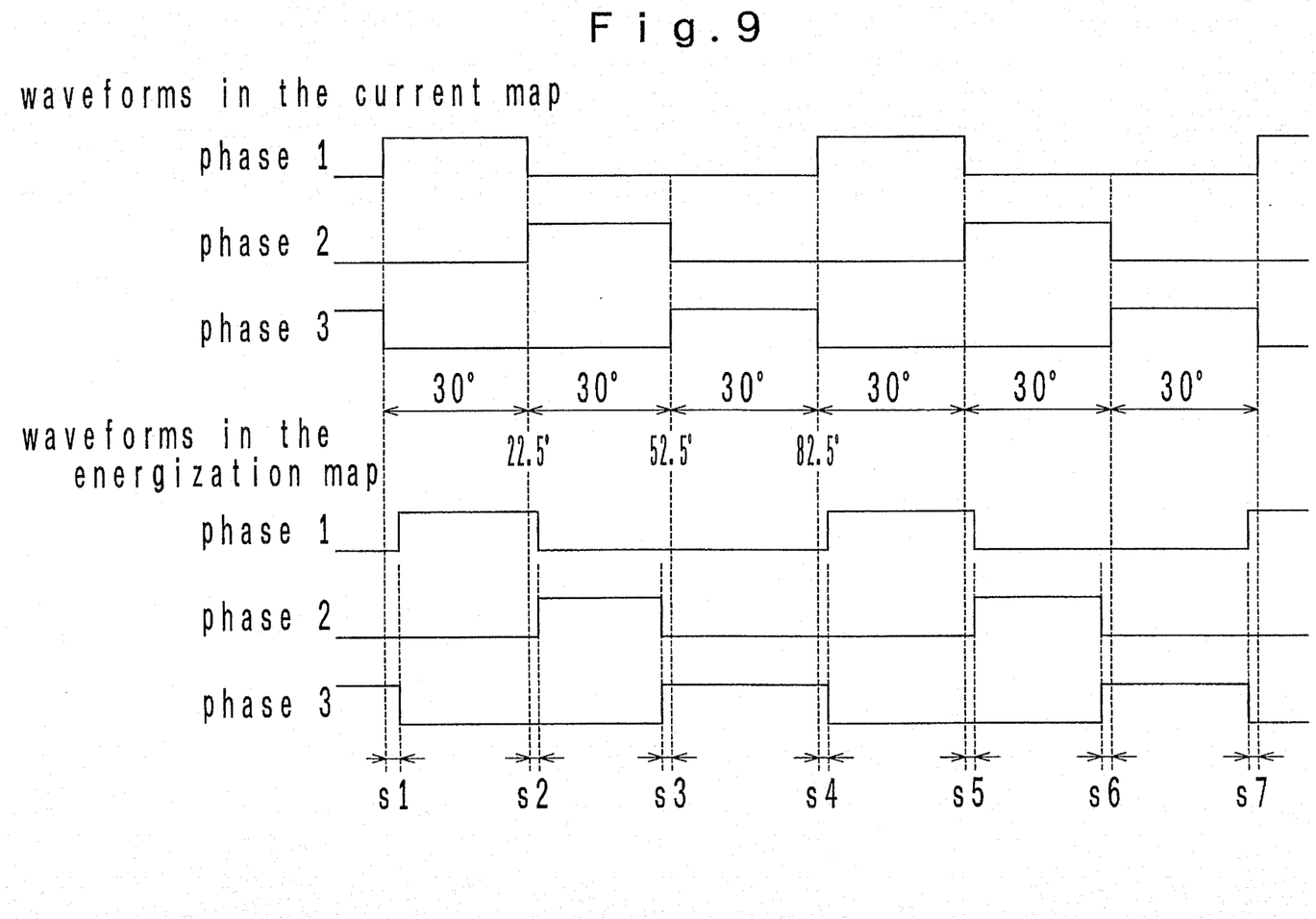
FIG. 9 is a series of timing charts showing the waveforms of the current map and the energization map according to the embodiment.

Accordingly, in the present embodiment, an energization map (corresponding to the waveforms shown in the lower portion of FIG. 9) is prepared in which the position for the switching of the energization is intentionally displaced with respect to the waveform (shown in the upper portion.) determined by data which is entered from the current map memory 13a, and the displaced energization map is used to control the actual switching of the energization of the individual coils. This energization map is formed on the memories 15a, 15b and 15c located within the current waveform shaping circuit shown in FIG. 2.

The offsets s1, s2, s3, s4, . . . (extending over 360° range) of the point of switching of the energization as defined in the energization map with respect to the point of switching of energization (particular rotatonal position) as represented by data stored in the current map memory 13a are determined at step 6A shown in FIG. 6. Such offsets s1, s2, s3, s4, . . . or angular shifts are generated according to a random number generating algorithm, and therefore have random values which are different from each other. As a consequence, if the SR motor 1 is driven at a given number of revolutions or rotational speed by switching the energization of the individual coils according to the energization map, it is assured that variations or fluctuations occur in the periods of the mechanical oscillations which occur in various parts of the motor. Hence, if the frequency of the mechanical oscillation should coincide with the natural frequency of the SR motor, that occurs only temporarily, and hence does not result in a resonance, thus enabling the peak noise level to be reduced.

In addition, the angular shifts produced at step 6A are limited to lie within a range of permissible shift angles as entered at step 69, so that the waveforms contained in the energization map cannot largely deviate relative to the points of switching of energization defined according to the waveforms of the current map. If a large deviation occurs in the points of switching of energization between the waveforms of the energization map and the waveforms of the current map, a high braking effort will be applied to the rotation in the intended direction of driving the rotor, resulting in a substantial degradation in the driving efficiency. A drive torque may be reduced in comparison to the power which is used for purpose of the energization, and the rising rate of the current may be reduced to decrease the drive torque. However, because the angular shifts are limited to lie within the range of permissible shift angles in the present embodiment, a reduction which occurs in the drive efficiency can be minimized.

If the angular shift is too small, the fluctuation which is caused in the mechanical oscillation generated will have a reduced excursion, thus reducing the intended effect of preventing the resonance. However, in the present embodiment, data contained in the shift map memory (see FIG. 7) is used, and the permissible shift which is considered to be optimum for the prevailing torque and the prevailing number of revolution is determined on the basis of such data, thus allowing a sufficiently large angular shift to be chosen within an extent which prevents a drastic reduction in the drive efficiency. In this manner, a large fluctuation in the mechanical oscillation is allowed, thus effectively preventing the occurrence of the resonance.

At step 6B shown in FIG. 6, data for the energization map as shown in FIGS. 8 and 9 are prepared on the basis of data entered at step 68 and the angular shifts produced at step 6A, and the latest energization map is used to update or re-write data stored in the memories 15a, 15b and 15c in the current waveform shaping circuit shown in FIG. 2. Obviously, the energization map is written into not only for one phase of the memories 15a, 15b and 15c shown in FIG. 2, but are prepared and written into the respective memories for all the three phases. In this embodiment, the current value of each phase is registered in the energization map for each 0.5° of the rotor angle, as shown in FIG. 8. Since the current flow through the coil 1a is controlled on the basis of data stored in the memories 15a, 15b and 15c as mentioned previously, when CPU 11 writes the energization map into the memories (namely, 15a, 15b and 15c for three phases), this is sufficient to assure that the switching of the energization of the respective coils takes place automatically through the hardware circuit in accordance therewith.

CPU 11 repeatedly executes the processings indicated at steps 62 to 6B. When the detected rotational speed and the torque of the SR motor remain constant, the program proceeds through steps 66–67–62, but in the event a change in the rotational speed occurs or a change in the torque occurs, the program proceeds through steps 68–69–6A–6B, thus updating the energization map on the memories 15a, 15b and 15c.

Figure 10:
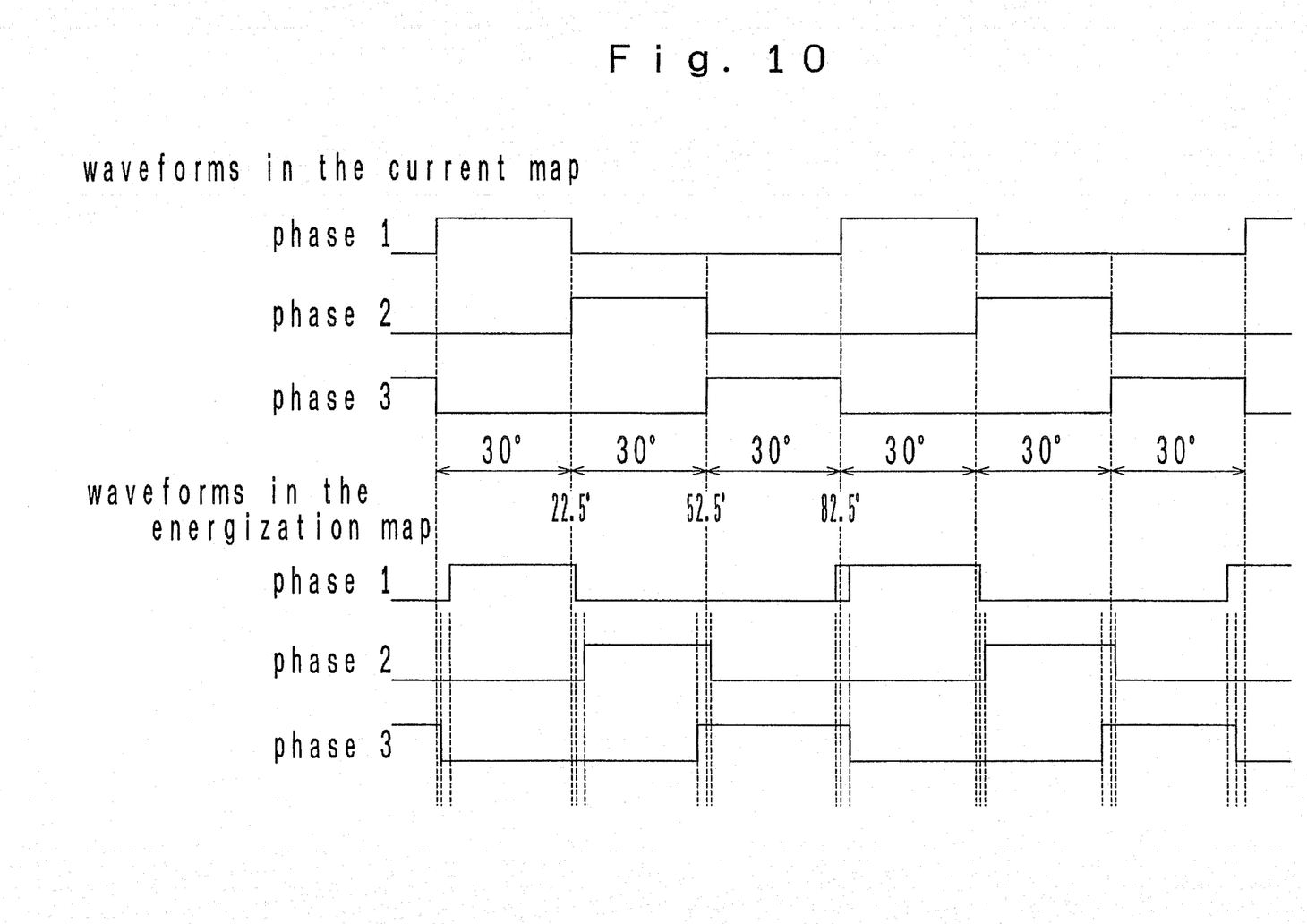
FIG. 10 is a series of timing charts showing the waveforms of a current map and an energization map according to a modification.

In the example shown in FIG. 9, the angular shift s1, s2, s3, s4, . . . are common to all of the three phases in the energization map prepared, and the control takes place so that the points where the turn-on/off takes place are synchronized between the different phases. However, angular shifts may be determined in a manner to be independent between different phases, as illustrated in FIG. 10 by way of example.

In the described embodiment, the energization maps are prepared so as to cover one revolution (360°) and are saved in the memories 15a, 15b and 15c of the current waveform shaping circuit. However, the energization map may be prepared so as to cover a plurality of revolutions so that the angular shifts may be different between successive revolution cycles. In such instance, a counter which counts the number of revolutions may be provided in the address decoder 15d to meet the need that the address values produced by the address decoder 15d be switched in accordance with the count in the counter.

As discussed, in accordance with the invention, if the SR motor is driven at a given number of revolutions, the timing of switching the energization of the coils are periodically varied by an offset (angular shift) which is intentionally generated, and accordingly the frequency of the mechanical oscillation which occurs in the SR motor always fluctuates. This means that if a coincidence between the frequency of the mechanical oscillation and the natural frequency of the SR motor occurs, that remains to be temporary only, thereby preventing the occurrence of a resonance and reducing the peaks of the noise level.

In a preferred embodiment of the invention, the offset between the particular rotational position and the actual position where the driving coils are turned on or off are determined by the random number generating means (69, 6A) to lie in a range of predetermined limit values. When the offset is determined in terms of random numbers, it is assured that the magnitude of the offset undergoes a fluctuation. When the magnitude of the offset increases to a certain degree, a reduced efficiency results in a reduction in the magnitude of the drive torque. However, such reduction in the efficiency can be suppressed by determining the offset in the range of predetermined limit values.

In a more preferred embodiment of the invention, such limit values are determined on the basis of the rotational speed of the rotor which is detected by the speed detecting means. Since a rate of reduction of the drive efficiency relative to the magnitude of the offset or the permissible reduction varies with the rotational speed or the target drive torque of the motor, changing the limit values for the offset in accordance with the rotational speed enables the resulting reduction in the drive torque to be suppressed within a permissible range while simultaneously enabling a sufficient reduction of the noise level.

What is claimed is:

1. A controller for switched reluctance motor including means for detecting a rotational position of a rotor and in which the energization of an electrical coil which is used to drive the rotor is switched at a particular rotational position of a respective pole on the rotor; characterized by position modifying means for providing an offset between the particular rotational position and an actual position where the energization of the coil is switched and for periodically modifying the magnitude of such offset.

2. A controller according to claim 1 in which the position modifying means includes random number generating means for determining the offset in a range defined by predetermined limit values for the offset.

3. A controller according to claim 2, further including speed detecting means which detects the rotational speed of the rotor, and wherein the position modifying means includes means for determining the limit values for the offset on the basis of the rotational speed of the rotor which is detected by the speed detecting means.

4. A controller according to claim 2, further including speed detecting means which detects the rotational speed of the rotor, and wherein the position modifying means includes means for determining the limit values for the offset on the basis of the rotational speed of the rotor which is detected by the speed detecting means and the prevailing motor driving torque.

5. A controller according to claim 4 in which the position modifying means includes memory table means which saves various values of the limit values in a manner corresponding to the rotational speed of the motor and the motor driving torque.

6. A controller according to claim 1, further including memory table means for storing information relating to rotational positions where the energization of the coils are switched as a plurality of sets, each of which corresponds to the rotational speed of the rotor and the motor driving torque.

7. A controller according to claim 1, further including waveform memory means which stores a target value of current to be passed through the coil for each of the rotational positions of the rotor.

\* \* \* \* \*